(12) United States Patent
Hashimoto (10) Patent No.: US 8,971,018 B2
(45) Date of Patent: Mar. 3, 2015

(54) ULTRACAPACITORS USING TRANSITION METAL NITRIDE-CONTAINING ELECTRODE AND TRANSITION METAL NITRIDE

(75) Inventor: Tadao Hashimoto, Santa Barbara, CA (US)

(73) Assignee: SixPoint Materials, Inc., Buellton, CA (US)

( * ) Notice: Subject to any disclaimer, the term of this patent is extended or adjusted under 35 U.S.C. 154(b) by 0 days.

(21) Appl. No.: 13/524,439

(22) Filed: Jun. 15, 2012

(65) Prior Publication Data

US 2012/0327559 A1    Dec. 27, 2012

Related U.S. Application Data

(60) Provisional application No. 61/501,656, filed on Jun. 27, 2011, provisional application No. 61/505,758, filed on Jul. 8, 2011.

(51) Int. Cl.
*H01G 9/155* (2006.01)
*H01G 11/30* (2013.01)
(Continued)

(52) U.S. Cl.
CPC ............ *H01G 11/30* (2013.01); *C01B 21/0615* (2013.01); *C01B 21/0617* (2013.01);
(Continued)

(58) Field of Classification Search
CPC .............................. H01G 11/30; H01G 9/042
USPC ......................................................... 361/502
See application file for complete search history.

(56) References Cited

U.S. PATENT DOCUMENTS

| 4,196,178 A | 4/1980 | Iwai et al. |
| 4,515,763 A | 5/1985 | Boudart et al. |

(Continued)

FOREIGN PATENT DOCUMENTS

| CN | 101061570 A | 10/2007 |
| EP | 1041610 A1 | 10/2000 |

(Continued)

OTHER PUBLICATIONS

Zhou et al., Study on the Electrochemical Behavior of Vanadium Nitride as a Promising Supercapacitor Material, 2009, Journal of Physics and Chemistry of Solids, 70, (2009), pp. 495-500.*

(Continued)

*Primary Examiner* — Eric Thomas
(74) *Attorney, Agent, or Firm* — Strategic Innovation IP Law Offices, P.C.

(57) ABSTRACT

The present invention discloses a new construction of ultracapacitor utilizing particles of transition metal nitride having negligible amount of halide impurities. The construction is expected to attain high specific energy density by using transition metal nitride particles and higher reliability by avoiding potential corrosion of metal components with halide impurities. The transition metal nitride particles are preferably synthesized by basic ammonothermal process, which utilizes supercritical ammonia with alkali metal mineralizers. Transition metal nitride such as vanadium nitride, molybdenum nitride, titanium nitride, nickel nitride, neodymium nitride, iron nitride, etc. can be synthesized in supercritical ammonia with reducing mineralizers such as potassium, sodium, lithium, magnesium, calcium, and aluminum. Since supercritical ammonia has characteristics of both gas and liquid, it can over complicated fine structure or fine particles. The new method is suitable for forming a protective coating on complicated structure or forming micro- to nano-sized particles.

28 Claims, 4 Drawing Sheets

(51) Int. Cl.
  *C01B 21/06* (2006.01)
  *H01G 9/042* (2006.01)
  *H01G 9/04* (2006.01)
  *H01G 11/50* (2013.01)
(52) U.S. Cl.
  CPC .............. *H01G9/042* (2013.01); *H01G 9/058* (2013.01); *H01G 11/50* (2013.01); *C01P 2004/64* (2013.01); *C01P 2006/12* (2013.01); *Y02T 10/7022* (2013.01); *Y02E 60/13* (2013.01)
  USPC ........................................................ 361/502

(56) References Cited

U.S. PATENT DOCUMENTS

| | | | |
|---|---|---|---|
| 4,851,206 | A | 7/1989 | Boudart |
| 5,680,292 | A | 10/1997 | Thompson, Jr. et al. |
| 6,168,694 | B1 | 1/2001 | Huang et al. |
| 6,743,947 | B1* | 6/2004 | Xu et al. ........................ 564/281 |
| 2007/0234946 | A1 | 10/2007 | Hashimoto et al. |
| 2010/0019207 | A1* | 1/2010 | Kumta et al. ................ 252/506 |
| 2010/0195269 | A1 | 8/2010 | Kim |
| 2012/0262842 | A1* | 10/2012 | Thompson et al. ........... 361/502 |
| 2012/0328883 | A1 | 12/2012 | Hashimoto |

FOREIGN PATENT DOCUMENTS

| | | |
|---|---|---|
| EP | 2723680 | 4/2014 |
| EP | 2724356 | 4/2014 |
| WO | WO96/19003 A1 | 6/1996 |
| WO | WO03/35945 A2 | 5/2003 |
| WO | WO2004/003261 A1 | 1/2004 |
| WO | WO2004/053206 A1 | 6/2004 |
| WO | WO2004/061923 A1 | 7/2004 |
| WO | WO2007/008198 A1 | 1/2007 |
| WO | WO2007/078844 A2 | 7/2007 |
| WO | WO2007/117689 A2 | 10/2007 |
| WO | WO2007/149487 A2 | 12/2007 |
| WO | WO2009/155043 A1 | 12/2009 |
| WO | WO2013/003073 | 1/2014 |
| WO | WO2013/003074 | 1/2014 |

OTHER PUBLICATIONS

U.S. Appl. No. 13/524,399 Amendment filed May 5, 2014.
Baishakhi Mazumder, et al., "Direct Solvothermal Synthesis of Early Transition Metal Nitrides," Inorganic Chemistry, vol. 47, No. 20, 2008, pp. 9684-9690, 2008 American Chemical Society Published on Web Sep. 19, 2008, XP55041257A.
Francois Cansell, et al., "Supercritical fluid processing: a new route for materials synthesis", Journal of Materials Chemistry, J. Mater. Chem, 1999, 9, pp. 67-75, XP55041255A.
Hasegawa M, et al., "Systematic study of formation and crystal structure of 3d-transition metal nitrides synthesized in a supercritical nitrogren fluid under 10 GPa and 1800K using diamond anvil cell and YAG laser heating" Journal of Alloys and Compounds, 403, 2005, pp. 131-142, XP027812183A.
PCT/US2012/042679 International Preliminary Report on Patentability and Written Opinion dated Jan. 7, 2014, 5 pages.
PCT/US2012/042679 International Search Report and Written Opinion, Oct. 15, 2012.
PCT/US2012/042689 International Preliminary Report on Patentability and Written Opinion dated Jan. 7, 2014, 7 pages.
PCT/US2012/042689 International Search Report and Written Opinion, Oct. 25, 2012.
Peters et al: Ammonothermal synthesis of aluminum nitride, Journal of Crystal Growth, 104, (1990) pp. 411-418, North Holland, Elsevier Science Publishers B.V. (North-Holand) XP27419868A.
Pietro Chirico et al: "Solvothermal synthesis of group 5 and 6 nitrides via reactions using LiNH₂ and ammonia nitrogen sources", Dalton Transactions, 2010; 39, pp. 6092-6097, XP55041398A.
Zajac M, et al: "Ammonothermal synthesis of GaN doped with transition metal ions (Mn, Fe, Cr)", Journal of Alloys and Compounds, 456 (2008), pp. 324-338, XP22590486A.
ZHOU, Xiaoping; Study on the electrochemical behavior of vanadium nitride as a promising supercapacitor material; Journal of Physics and Chemistry of Solids; Journal of Physics and Chemistry of Solids 70 (2009), pp. 495-500.
U.S. Appl. No. 13/524,399 Office Action dated Feb. 5, 2014.
Desmoulins-Krawiec, Sophie et al, "Synthesis of nanostructured materials in supercritical ammonia: nitrides, metals and oxides", Journal of Materials Chemistry (2004), 14 (2), 228-232.
Leineweber, Andreas et al, "Ordering of Nitrogen in Nickel Nitride $Nl_3N$ Determined by Neutron Diffraction" American Chemical Society; Inorg. Chem 2001, 40: pp. 5818-5822.
Callahan, M., et al, "GaN single crystals grown on HVPE seeds in alkaline supercritical ammonia", A Novel Method of Advanced Materials Processing, J. Mater SCI, 41, (2006), pp. 1399-1407, Springer Science + Business Media, Inc.
Callahan, Michael J., et al, "Growth of GaN crystals under ammonothermal conditions", Mat. Res. Soc. Symp. Proc., vol. 798, 2004, Materials Research Society, pp. Y2.10.1-Y2.10.6.
Dwilinski, R. et al, "Ammono method of BN, AlN and GaN synthesis and crystal growth", MRS Internet Journal Nitride Semiconductor Research, 3, 25, (1998), pp. 1-4, The Materials Research Society.
Ehrentraut, Dirk, et al, "Reviewing recent developments in the acid ammonothermal crystal growth of gallium nitride", Journal of Crystal Growth, 310, (2008), pp. 3902-3906, Elsevier B.V.
Ehrentraut, Dirk, et al., "Technology of Gallium Nitride Crystal Growth", 2010 book, pp. 268-273, Springer Series in Materials Science.
Hashimoto, Tadao, et al, "Growth of gallium nitride via fluid transport in supercritical ammonia", Journal of Crystal Growth, 275, (2005), pp. e525-e530, Elsevier B.V.
Hashimoto, Tadao, et al, "Phase selection of Microcrystalline GaN synthesized in supercritical ammonia", Journal of Crystal Growth, 291, (2006), pp. 100-106, Elsevier B.V.
Hashimoto, Tadao, et al, "Status and perspectives of the ammonothermal growth of GaN substrates", Journal of Crystal Growth, vol. 310, Issue 5, (2008), pp. 876-880, ISSN 0022-0248, Elsevier B.V.
Jacobs, H., et al, "High-Pressure Ammonolysis in Solid-State Chemistry", Chapter 5, vol. 8, Current Topics in Materials Science, edited by E. Kaldis, pp. 383-427, North Holland Publishing Company, 1982.
Porowski, S., "Near defect free GaN substrates", MRS Proceedings, vol. 537, 1998, G1.3 doi:10.1557/PROC-537-G1.3, 12 pgs.
Purdy, Andrew P., et al, "Ammonothermal recrystallization of gallium nitride with acidic mineralizers", Crystal Growth & Design, vol. 2, No. 2, 2002, pp. 141-145, American Chemical Society.
Ramachandran, V., et al, "Inversion of wurtzite GaN (0001) by exposure to magnesium,", Applied Physics Letters, vol. 75, No. 6, 1999, pp. 808-810, American Institute of Physics.
Richter, Theresia, M.M., et al, "Chemistry of Ammonothermal Synthesis", Inorganics, 2, 2014, ISSN 2304-6740, pp. 29-78, MDPI, Basel, Switzerland, doi: 10.3390/inorganics2010029.
Wang, Buguo, et al, "Ammonothermal growth of GaN crystals in alkaline solutions", Journal of Crystal Growth, 287, (2006), pp. 376-380, Elsevier B.V.
Zajac, M., et al, "Possible origin of ferromagnetism in (Ga,Mn)N", AIP Journal of Applied Physics, vol. 93, No. 8, (2003), pp. 4715-4717, AIP Publishing, doi:10.1063/1.1559939.
EP12730334.5 Response to Communication Rule 161 and 162 EPC mailed Aug. 14, 2014, 11 pgs.
EP12731245.2 Response to Communication Rule 161 and 162 EPC mailed Aug. 14, 2014, 8 pgs.
U.S. Appl. No. 13/524,399 Final Office Action dated Jun. 30, 2014.
U.S. Appl. No. 13/524,399 RCE and Amendment dated Sep. 30, 2014.
U.S. Appl. No. 13/524,399 Notice of Allowance dated Oct. 16, 2014.

\* cited by examiner

ULTRACAPACITORS USING TRANSITION METAL NITRIDE-CONTAINING ELECTRODE AND TRANSITION METAL NITRIDE

This application claims priority under 35 U.S.C. Sec. 119 (e) to U.S. app. 61/501,656 filed Jun. 27, 2011 with Tadao Hashimoto as inventor and entitled "SYNTHESIS METHOD FOR TRANSITION METAL NITRIDE AND TRANSITION METAL NITRIDE" and to U.S. app. 61/505,758 filed Jul. 8, 2011 with Tadao Hashimoto as inventor and entitled "ULTRA CAPACITORS USING VANADIUM NITRIDE-CONTAINING ELECTRODE AND SYNTHESIS METHOD OF TRANSITION METAL NITRIDE AND TRANSITION METAL NITRIDE." The contents of these patent applications are incorporated by reference herein as if put forth in full below.

BACKGROUND

1. Field of the Invention

The invention is related to ultracapacitors also known as supercapacitors. The applications of the ultracapacitors may include hybrid/electric vehicles, spacecrafts, uninterrupted power supplies and memory backup power supplies. Also, the invention is related to transition metal nitrides and their synthesis methods. The forms that the transition metal nitrides may take thin film layers, micrometer-sized particles, and nanometer-sized particles. The applications may include a thin film as a wear protective layer, particles for ultracapacitors, particles of catalysts, particles as an additive of a wear-resistant coating, and magnets.

2. Description of the Existing Technology and some of its Problems

Ultracapacitors store energy using either ion adsorption (electric double layer capacitors, EDLCs) or fast surface redox (reduction-oxidation) reactions (pseudo-capacitors). The ultracapacitors can store several magnitudes of higher electric charges than the conventional capacitors. Compared with the conventional batteries, the ultracapacitors can be charged-discharged much faster because it does not involve chemical redox reactions. In addition, due to extremely low internal resistance, it can supply much higher current than the conventional batteries. Although the total energy density is about one order of magnitude lower than that of the conventional batteries, the unique characteristics of the ultracapacitors found their applications in memory back-ups, booster power supplies for hybrid/electric vehicles, and temporary power supplies for short power outage. For weight-sensitive applications such as hybrid/electric vehicles, aircrafts, and spacecrafts, ultracapacitors with higher energy density is required. Ultracapacitors having comparable energy density with the conventional batteries are strongly demanded recently.

The ultracapacitors are conventionally constructed with carbon-based electrodes; however, due to low specific capacitance of carbon-based electrodes, the energy density is more than one order of magnitude lower than that of the conventional batteries. The specific energy density is proportional to the specific capacitance, therefore, it is very important to increase the specific capacitance of the electrodes. Similar to the conventional capacitors, the specific capacitance is proportional to the specific surface area and the dielectric constant, thus many improvements have been made to improve the electrodes.

For example, the US patent (US 2008 0180881 A1)[1] discloses extremely large specific surface area (1500 $m^2$/g) by utilizing nano-sized porous carbon structure. However, the specific capacitance is as low as the order of 100 F/g. In the US patent (US 2011-0149473 A1)[2], the specific capacitance is increased by adding nano-sized particle having high dielectric constant onto the carbon-based electrodes. Although this approach is effective to increase the specific capacitance, the carbon-based electrode has a disadvantage of inherently low specific capacitance. Alternative material such as metal oxide is explored, and ruthenium oxide ($RuO_2$) is reported to have high specific capacitance of 600 F/g [3]. However, due to extremely high cost of Ru, this is not preferable for a practical use. In contrast, metal nitride is reported to have high specific capacitance. Vanadium nitride recorded the specific capacitance as high as 1340 F/g [4]. Also, US patent (US 2010-0019207 A1)[5] disclosed high specific capacitance of ternary transition metal nitride, i.e. mixture of transition metal nitrides.

Although transition metal nitride has a great potential to improve the performance of ultracapacitors, its synthesis is challenging due to its chemical stability. The Ref. 4 and 5 discloses a synthesis method of transition metal nitride using chloride precursors. However, the method may leave halide impurities, which potentially causes corrosion of the support metals for electrodes, the electric terminals or the housing. To achieve reliable ultracapacitors with transition metal nitride, a synthesis method which does not involve a halide element is preferred.

Historically, transition metal nitride has been used as wear-resistant coatings and thermal barriers, due to its strong mechanical and thermal property. Along with the development of structural and mechanical engineering, the coatings and barriers are required to cover complicated and fine structures. In other words, the surface area relative to its volume is becoming larger in recent years.

It is also reported that transition metal nitride is useful as a functional material for ultracapacitors, catalysts, and magnet. To use transition metal nitride as ultracapacitor, catalysts, or magnets, it is important to increase the surface area of the material. Nanotechnology using nano-sized particles has a potential of obtaining superior characteristics due to extremely large surface area relative to its weight. Functional materials requiring large surface area such as ultracapacitors and catalyst receives tremendous benefit from nanotechnology.

With increasing demand of covering small-sized material with large surface area, the existing synthesis method is facing several challenges. Since transition metal is more readily oxidized than nitridized, synthesis of transition metal nitride requires elimination of oxygen and moisture. Synthesis methods typically involve vapor phase reaction in vacuum/air tight reactors. To form a nitride layer on transition metal parts, physical vapor deposition or plasma deposition are used. However, these methods are unable to coat complicated structure having deep blind holes because vapor phase reactant does not reach the bottom surface of the deep holes.

In the case of particle synthesis, vapor phase method is even less efficient because of extremely high surface area to cover. When the particles have size less than 10 nm or specific surface area larger than 10 $m^2$/g, it becomes challenging for the gaseous agents to cover the entire surface. For example, vanadium nitride nanoparticles are synthesized using $VCl_4$ as precursor. The $VCl_4$ is dissolved and stirred in anhydrous chloroform inside a glovebox. The solution is then transferred to an Ar-filled glove bag, where the dissolved chloride is reacted with anhydrous ammonia gas over solution for 8 hours. The as-prepared powder is collected by evaporating the solvent at 100° C. under continuous $NH_3$ gas flow. Final heat treatment for nitridization is conducted under an anhydrous ammonia atmosphere with a heating and cooling rate of 5° C./min. The temperature for heat treatment is 400° C. [4]. As shown in this example, the final heat treatment involves vapor phase reaction with constant ammonia flow at high temperature. A high temperature such as this can cause sintering, resulting in larger particle size than what would be achieved using a lower-temperature process. Also, this process may leave chlorine impurities in the synthesized transition metal nitride.

The challenges in the existing synthesis methods of transition metal nitride are summarized as follows: (1) the existing methods use vapor phase reaction which is unable to cover surfaces of complicated structures or small particles; (2) the existing methods require constant flow of source gas such as ammonia or nitrogen; (3) some existing methods use metal halide precursors, which leaves halogen impurities unfavorable to ultracapacitor applications; (4) some existing methods requires multiple steps to obtain transition metal nitride; (5) some existing methods requires high temperature which causes larger particle size.

SUMMARY OF THE INVENTION

To overcome challenges associated with the ultracapacitors, the present invention provides a new ultracapacitor utilizing transition metal nitride or mixture of transition metal nitrides which does not contain halide impurities. The construction of the ultracapacitor may follow the conventional manner. The present invention utilizes small particles of transition metal nitrides, which is synthesized in supercritical ammonia with alkali metal mineralizers. This process does not involve halide elements, thus produces transition metal nitrides without halide impurities. The additional merit is that some alkali metals may be doped into the produced transition metal nitride, which may increase the efficiency of electrolyte. This new construction is expected to realize highly reliable, high-energy density ultracapacitors.

In the new method of synthesizing transition metal nitride in supercritical ammonia provided by the invention, a source material containing transition metal is supplied to a high-pressure reactor together with ammonia and mineralizers. Mineralizers, which act as reducing agents, are selected from alkali metal, alkaline earth metals or aluminum. Then, the reactor is heated at 132° C. or higher to attain supercritical condition of ammonia. The reactor is typically sealed to attain self-pressurization of ammonia upon heating, however; a semi-open reactor which allows additional feeding of source, mineralizer or ammonia is also usable. The high reactivity of mineralized supercritical ammonia is very effective to nitridize transition metals at lower temperature than conventional method, thereby producing e.g. catalyst particles of smaller particle size than processes that sinter particles at higher temperatures.

BRIEF DESCRIPTION OF THE DRAWINGS

Referring now to the drawings in which like reference numbers represent corresponding parts throughout:

FIG. 1 is one construction of ultracapacitor.
100 Anode electrode
200 Cathode electrode
300 Metal foil for anode
400 Metal foil for cathode
500 Separator
600 Anode electric terminal
700 Cathode electric terminal
800 Electrolyte
900 Housing
FIG. 2 is one construction of stacked ultracapacitor
100 Anode electrode
200 Cathode electrode
300 Metal foil for anode
400 Metal foil for cathode
500 Separator
600 Anode electric terminal
700 Cathode electric terminal
800 Electrolyte
900 Housing
1000 One unit set of capacitor for stacking
FIG. 3 is one construction of reactor.
3100 High-pressure reactor
3200 Lid of high-pressure reactor with gas inlet port
3201 Gas inlet port
3202 High-pressure valve
3300 Gasket seal
3400 External heater
3500 Ammonobasic solution (ammonia with dissolved mineralizer)
3600 Source material containing transition metal

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description of the Invention

The ultracapacitor of the current invention utilizes one or more electrodes containing a transition metal nitride or a mixture of transition metal nitrides in which the concentration of halide impurities is negligible, which aids in preventing corrosion of various metal components. The amount of halide present in the transition metal nitride particles is typically less than 1 ppm and more preferably less than the detection limit of the commonly used analysis equipment such as gas chromatography-mass spectroscopy (GC-MS), glow discharge mass spectroscopy (GDMS), inductively coupled plasma mass spectroscopy (ICP-MS), secondary ion mass spectroscopy (SIMS) available today. Also, the acceptable level of the halide impurities in the transition metal nitride particles may be decided by a lifetime test of the ultracapacitors. The lifetime is typically measured as a cycle life. The halide impurity level is preferably low enough to achieve 100,000 cycle life or more preferably 500,000 cycle life. The particles of transition metal nitride or mixed transition metal nitrides are preferably synthesized by the ammonothermal method using alkali metal mineralizers, which provide a halide-free environment. By transition metal nitride particles being "halide-free" or having a "negligible amount of halide impurities," we therefore mean that the amount of halogen present in the particles is only that amount that is present from contaminants in e.g. source material for the transition metal, ammonia used as the solvent, optional mineralizer used to make the transition metal nitride particles, and what might be drawn from any materials in the reactor environment during reactor charging and use (for example, any halide leached from e.g. valve, tubing, pipe, metal, or other source). The average particle size of the transition metal nitride particle as measured by laser-based particle analyzer or other methods is preferably less than 100 nm and the resulting specific surface area as measured by BET porosimiter or other methods is preferably greater than 10 $m^2/g$. The smaller the particle size, the larger the specific surface area, which provides larger specific capacitance. However, too small particles may have a problem of total oxidation of the particles. Consequently, an average particle size greater than that which produces total oxidation during cycle use is preferred. Therefore, appropriate particle size should be chosen to achieve reliable ultracapacitors.

Figure 1:
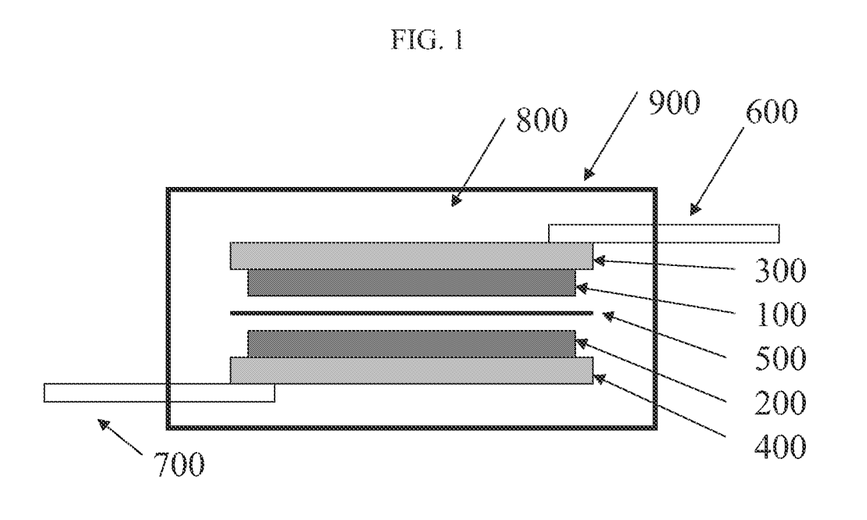

FIG. 1 shows one example of the ultracapacitor in the current invention. An anode electrode 100, which may contain transition metal nitride particles, is formed on an anode metal foil 300, which is connected to an anode electric terminal 600. On the other side, a cathode electrode 200, which may instead or may also contain transition metal nitride particles, is formed on a cathode metal foil 400 and is connected to a cathode electric terminal 700. A separator 500 is placed between the anode electrode 100 and the cathode electrode 200. These components are placed in a housing 900 with electrolyte 800. The anode electric terminal 600 and the cathode electric terminal 700 extend outside of the housing so that the ultracapacitor may be connected to an external electric circuit.

Figure 2:
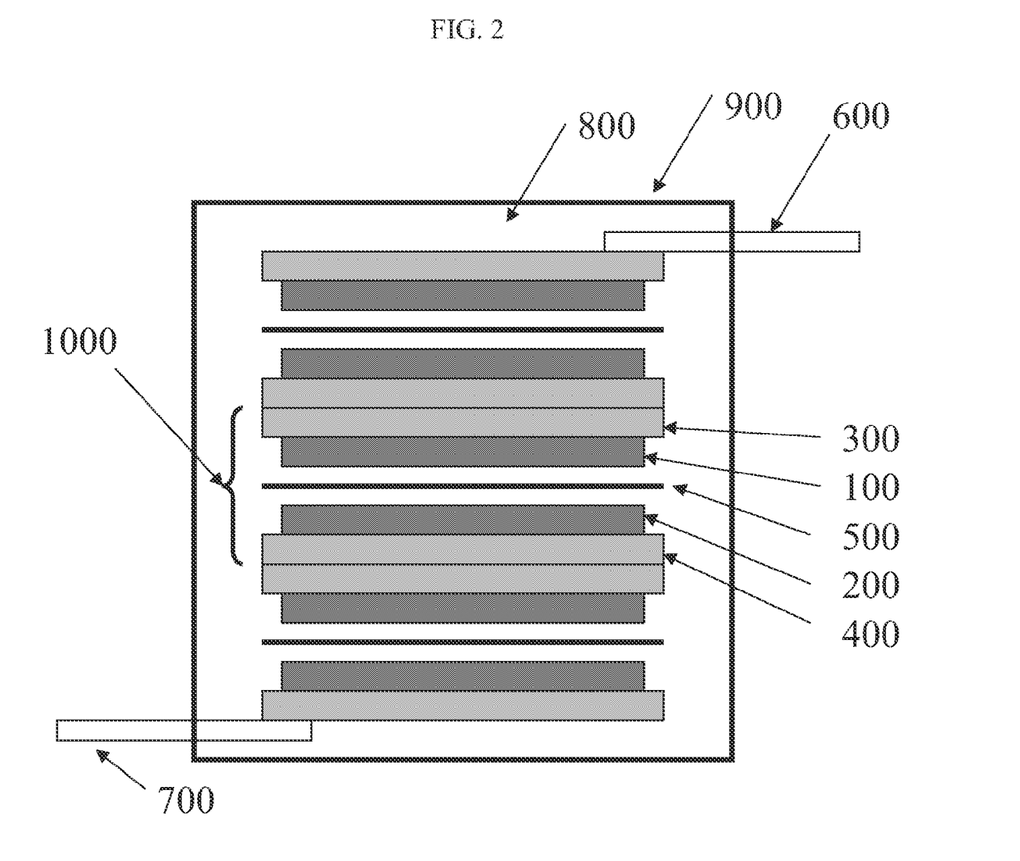

Another example of the ultracapacitor in the current invention is shown in FIG. 2. A unit capacitor which consists of an anode electrode 100, which may contain transition metal particles formed on an anode metal foil 300, a separator 500, and a cathode electrode 200, which may additionally or instead contain transition metal particles formed on a cathode metal foil 400. The unit capacitor is placed in a series connection of capacitors inside the housing 900. The outermost electrodes are connected to an anode electric terminal 600 and a cathode electric terminal 700 having electrodes connected to them in order to generate greater output voltage. The components are placed in a housing 900 with electrolyte 800. The anode electric terminal 600 and the cathode electric terminal 700 extend outside of the housing so that the ultracapacitor can be connected to an external electric circuit.

The particles of transition metal nitride or mixture of transition metal nitrides in the current invention are preferably synthesized by the basic ammonothermal process, which utilizes supercritical ammonia with alkali mineralizers. Over the critical point of 132.4° C. and 11.28 MPa, ammonia becomes the supercritical condition, which is a state between liquid and gas. We found that supercritical ammonia with strong reducing mineralizer such as alkali metals is capable of forming transition metal nitride. This process is a one-step process in a closed reactor and does not require constant flow of ammonia. By changing process temperature, pressure, mineralizer and time, the particle size is expected to be controlled from nano-scale to micron-scale. The advantage of the basic ammonothermal synthesis is its halide-free environment. Transition metal nitride containing halide impurities is not preferable for reliability of ultracapacitors, since halide impurity such as chlorine corrodes internal components such as the metal foils and the metal housing. In addition, the basic ammonothermal process can intentionally dope alkali metal in the synthesized transition metal nitride, which may help the efficiency of the electrolyte.

EXAMPLE 1

Vanadium nitride particles synthesized by the basic ammonothermal process are used for both anode and cathode electrodes. The particle size is less than 100 nm which provides the specific surface area larger than 10 $m^2/g$. The vanadium nitride particles are mixed with the conventional conductive powder materials such as graphite powder and binder, dispersed in a solvent, and coated on aluminum foil with electric terminal wires. Any coating method such as dip coating, spray coating, and printing can be used. After baking the electrode/aluminum foil, the coated film containing the vanadium nitride particles forms a porous film with specific surface area close to the original powder. The two electrodes are mated with a separator of capacitor-grade porous paper between them. Insulating sheet is attached to the backside of the anode foil. Instead of using the insulating sheet, insulating oxide film can be formed on the backside of the aluminum foil. Then, the entire assembly is soaked in dilute KOH, rolled and placed in a cylindrical housing made of aluminum. The electrode terminal lead wire is taken out of the housing using appropriate rubber or plastic bushings and the housing is carefully sealed with a lid. If necessary, venting mechanism using a perforated rubber or plastic cap may be used.

EXAMPLE 2

Instead of rolling the entire assembly in Example 1, multiple sets of capacitor assembly is stacked by electrically connecting them, soaked in dilute KOH and placed in a box housing. After taking the outermost electric terminal wire outside of the housing using appropriate rubber or plastic bushings, the lid is carefully sealed. If necessary, venting mechanism using a perforated rubber cap may be used.

EXAMPLE 3

Instead of using vanadium nitride, vanadium-niobium nitride particles are used to enhance the stability of the electrode material.

The method of synthesizing transition metal nitrides in the current invention may utilize supercritical ammonia. Over the critical point of 132.4° C. and 11.28 MPa, ammonia becomes the supercritical condition, which is a state between liquid and gas. We found that supercritical ammonia with, optionally but desirably, a strong reducing mineralizer such as alkali metals, alkaline earth metals or aluminum is capable of forming transition metal nitride.

A source material containing transition metal contains an amount of transition metal effective to accomplish a particular purpose. For instance, a substrate may be coated with a layer of transition metal that is to be converted to a nitride, so that the surface layer may be effective as a heat barrier or wear protective surface. Another example is that particles may contain an amount of a transition metal that, upon conversion to nitride, are catalytically active or will bear a certain amount of electrical charge when formed into an ultracapacitor. The source material may contain more than 10 percent of transition metal by weight.

This process may in one instance be a one-step process in a closed reactor and does not require constant flow of ammonia. By changing process temperature, pressure, mineralizer and time, the layer thickness or particle size is expected to be controlled from nano-scale to micron-scale. A batch process such as this may therefore enable all of the reaction materials to be placed into the high-pressure reactor and the product to be separated from the reactor after the reaction has concluded.

The process may in another instance be conducted with either constant flow of ammonia or with periodic addition of ammonia to the high-pressure reactor. A semi-batch process such as this may therefore allow some of the reaction materials such as the source material and optional mineralizer to be added to the reactor first and ammonia added either continuously or periodically during the reaction. Further, either source or mineralizer may instead or additionally be continuously or periodically added to the reactor during the reaction.

Figure 3:
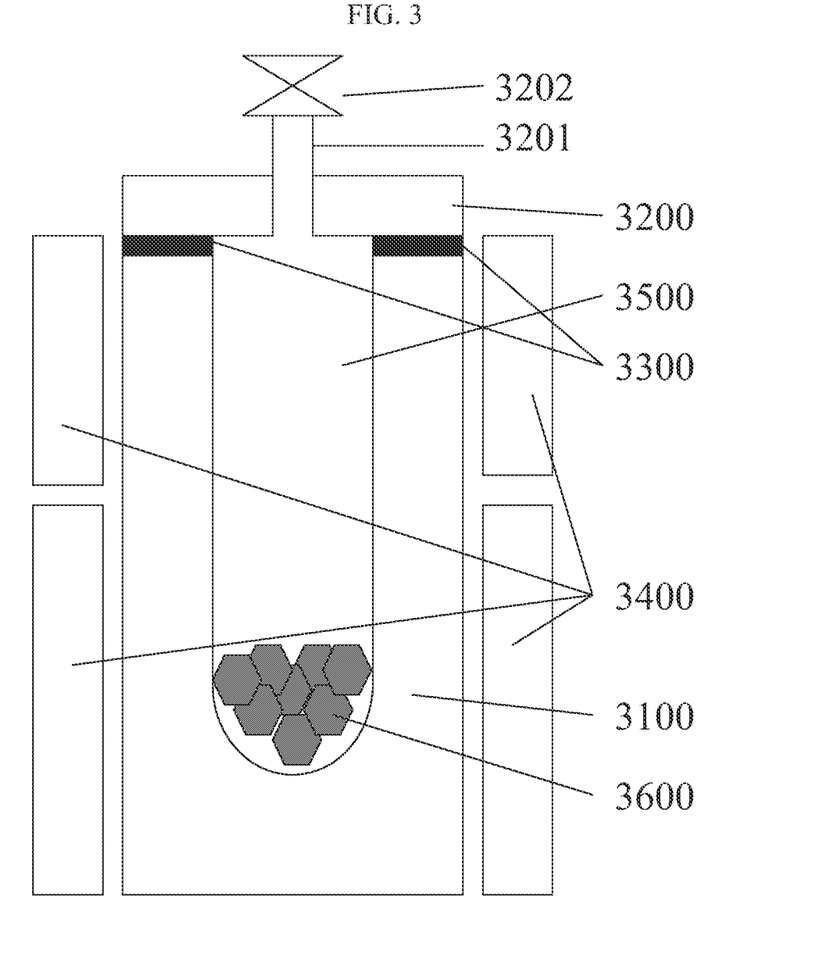
Figure 4:
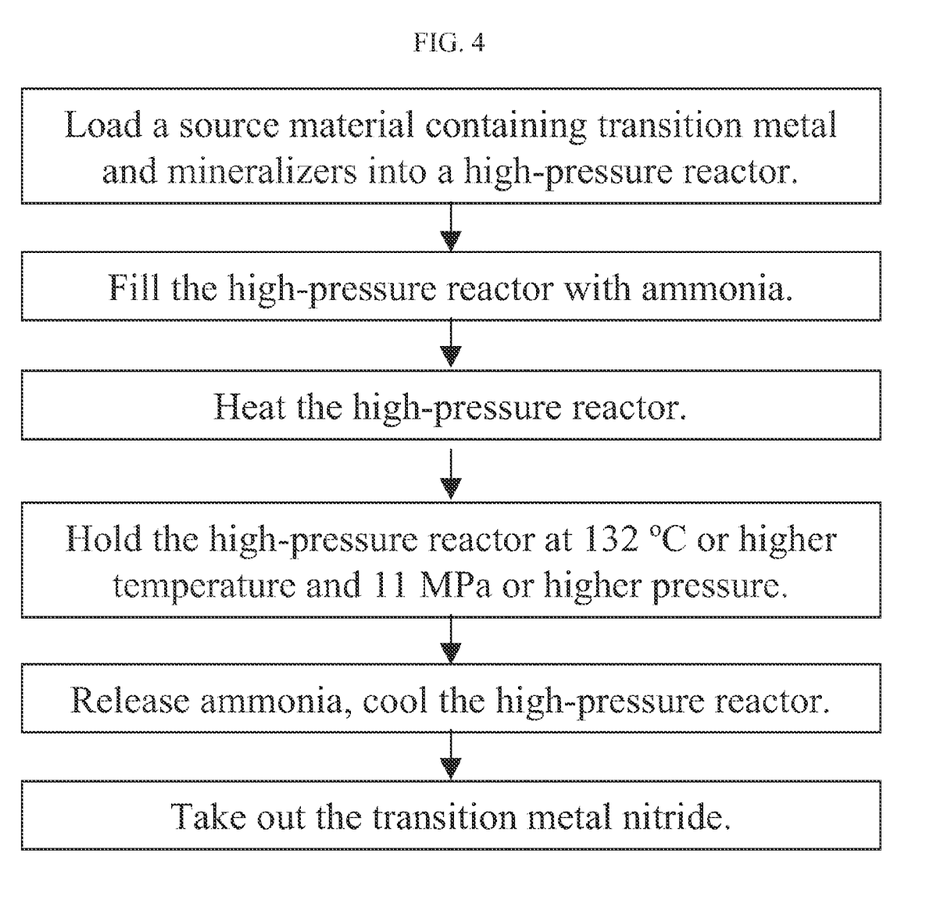
FIG. 4 is a standard process flow of current invention.

A standard process as diagramed in FIG. 4 is depicted in FIG. 3. A standard process as described uses high-pressure reactor 3100. A source material containing transition metal 3600 is placed in the high-pressure reactor 3100 together with a mineralizer. Since mineralizer is highly reactive with oxygen, it is favorable to work in a glovebox filled with nitrogen or argon. The lid 3200 has a gas inlet port 3201 which is connected to a high-pressure valve 3202. After charging the source material 3600 and a mineralizer in the high-pressure reactor 3100, the lid 3200 is closed using a gasket 3300 to prevent leaking of ammonia at high pressure. The high-pressure valve 3202 is also closed. Then, the high-pressure reactor 3100 is taken out of the glovebox and the high-pressure valve 3202 is connected to a gas/vacuum line. The high-pressure reactor 3100 is pumped through the gas inlet port 3201 by opening the high-pressure valve 3202. After attaining sufficient vacuum level, the high-pressure reactor 3100 is externally chilled with liquid nitrogen and filled with gaseous ammonia through the gas inlet port 3201. The gaseous ammonia is condensed to the liquid phase in the high-pressure reactor 3100. Alternatively, liquid ammonia may be directly introduced to the high-pressure reactor 3100 by applying sufficient pressure. After filling predetermined amount of liquid ammonia, the high-pressure valve 3202 is closed and disconnected from the gas/vacuum line. The high-pressure reactor 3100 is transferred to a furnace and externally heated. Since the high-pressure reactor 3100 is sealed, it is self pressurized with heated ammonia and the ammonia reaches supercritical condition. The mineralizer is dissolved in ammonia creating ammonobasic solution 3500. The source material containing transition metal 3600 inside the high-pressure reactor 3100 is nitridized with the ammonobasic solution 3500. After predetermined time, the ammonia is released by opening the high-pressure valve 3202. The transition metal nitride is taken out of the high-pressure reactor 3100 after the high-pressure reactor 3100 is cooled. The transition metal nitride is rinsed with water to remove mineralizers. The last step creates a thin oxide layer on the top surface of the transition metal nitride.

Mineralizer can be selected based on the metal nitride to synthesize. Sodium metal is commonly used, but if higher reactivity is needed, one may choose potassium-based mineralizer. Conversely, if milder reactivity is favored one may choose lithium-based mineralizers. If even milder reactivity is favored, magnesium or calcium based mineralizers may be selected. Also, if removal of oxygen is the primary purpose of mineralizer, metallic calcium, aluminum or magnesium may be suited for a mineralizer. Mixture of these materials may also be used to control the reaction.

EXAMPLE 4

A vanadium foil of approximately 13 mm in diameter and 2.6 g of Na were placed in a high-pressure reactor having an internal volume of 127 cc in a glove box in which the oxygen and moisture concentration is regulated below 0.1 ppm. Then, the high-pressure reactor was sealed and nitrogen in the reactor was evacuated with turbo molecular pump through a gas inlet port. After pumping the reactor to less than $10^{-6}$ mbar, the reactor was chilled by immersing it in liquid nitrogen and gaseous anhydrous ammonia was introduced in the reactor through the gas inlet port. Approximately 43.7 g of liquid anhydrous ammonia was condensed in the reactor. The sealed reactor was then transferred to a furnace and heated at 530~535° C. for 5 days. The resulting pressure was 167 MPa (24,170 psi). After the process, the vanadium foil showed goldish color, indicating the surface of the vanadium foil was nitridized. When yellowish powder of $V_2O_5$ was used as a starting material, black colored powder, which is expected to be VN, were obtained.

EXAMPLE 5

Similar experiment as example 1 was conducted for molybdenum and titanium, and confirmed color change in of these metals.

EXAMPLE 6

Similar experiment as example 1 is conducted with a high-pressure reactor having gas inlet port and high-pressure valve. During the process, pressurized ammonia is supplied to supplement ammonia consumed during the process.

EXAMPLE 7

Using similar high-pressure reactor, vanadium-containing tools or parts are coated with transition metal nitride by nitridizing the surface of the metal. Also, these tools or parts are coated with metallic vanadium prior to the ammonothermal process to form thicker protective layer of transition metal nitride.

EXAMPLE 8

A high-pressure reactor has the following particles placed in it sequentially along with a mineralizer and ammonia: niobium, tin, indium, platinum, tantalum, zirconium, copper, iron, tungsten, chromium, molybdenum, hafnium, titanium, vanadium, cobalt, manganese, cerium, mercury, plutonium, gold, silver, iridium, palladium, yttrium, ruthenium, lanthanum, cerium, praseodymium, neodymium, promethium, samarium, europium, gadolinium, terbium, dysprosium, holmium, erbium, thulium, ytterbium, lutetium and nickel. The reactor is heated, and the ammonia is placed in supercritical state within the high-pressure reactor. The respective niobium nitride, tin nitride, indium nitride, platinum nitride, tantalum nitride, zirconium nitride, copper nitride, iron nitride, tungsten nitride, chromium nitride, molybdenum nitride, hafnium nitride, titanium nitride, vanadium nitride, cobalt nitride, manganese nitride, cerium nitride, mercury nitride, plutonium nitride, gold nitride, silver nitride, iridium nitride, palladium nitride, yttrium nitride, ruthenium nitride, lanthanum nitride, cerium nitride, praseodymium nitride, neodymium nitride, promethium nitride, samarium nitride, europium nitride, gadolinium nitride, terbium nitride, dysprosium nitride, holmium nitride, erbium nitride, thulium nitride, ytterbium nitride, lutetium nitride and nickel nitride nanoparticles are obtained. Preferred phase of transition metal nitride could be obtained by adjusting process temperature.

In view of the above, non-limiting examples of what are disclosed are:
1. An electric energy storage device comprising
    (a) an anode electrode;
    (b) a cathode electrode;
    (c) a separator between the anode electrode and the cathode electrode;
    (d) an electrolyte between the anode electrode and the cathode electrode; wherein at least one electrode contains a transition metal nitride or mixture of transition metal nitrides, having a negligible amount of halide impurities.
2. An electric energy storage device of paragraph 1, wherein both the anode electrode and cathode electrode contain said transition metal nitride or mixture of transition metal-nitrides, having the negligible amount of halide impurities.
3. An electric energy storage device of paragraph 1 or paragraph 2, wherein the transition metal nitride or mixture of transition metal nitrides further contains an alkali metal additive.
4. An electric energy storage device of paragraph 3, wherein the alkali metal additive comprises at least one alkali metal from the group consisting of Li, Na, and K.
5. An electric energy storage device of any of paragraphs 1-4, further comprising electric terminals connected to each electrode, exposed outside of a housing which encapsulates the anode electrode, the cathode electrode, the separator, and the electrolyte.
6. An electric energy storage device of any of paragraphs 1-4, further comprising a stack of a plurality of a set of the anode electrode, the separator, and the cathode electrode, the stack being encapsulated in a housing having the electrolyte, with electric terminals connected to the outermost electrodes and exposed outside of the housing.
7. An electric energy storage device of any of paragraphs 1-6, wherein the electrode comprises a porous film containing particles of transition metal nitride or mixture of transition metal nitrides formed on a metal foil.
8. An electric energy storage device of paragraph 7, wherein the porous film contains more than 10 weight percent of transition metal nitride or mixture of transition metal nitrides.
9. An electric energy storage device of paragraph 7 or paragraph 10, further comprising a metal foil, and wherein the metal foil comprises aluminum.
10. An electric energy storage device of any of paragraphs 1-12, wherein the particles of the transition metal nitride or the mixture of transition metal nitrides have a specific surface area greater than 10 m²/g.
11. An electric energy storage device of any of paragraphs 1-10, wherein the particles of the transition metal nitride or the mixture of transition metal nitrides have a size less than 100 nm.
12. An electric energy storage device of any of paragraphs 1-11, wherein the transition metal nitride comprises vanadium nitride.
13. An electric energy storage device of any of paragraphs 1-11, wherein the electrolyte comprises propylene carbonate or acetonitrile.
14. An electric energy storage device of any of paragraphs 1-13, wherein the electrolyte is a basic solution.
15. An electric energy storage device of any of paragraphs 1-14, wherein the transition metal nitride is synthesized in supercritical ammonia.
16. An electric energy storage device having a first electrode and a second electrode, wherein at least one of the electrodes is formed using transition metal nitride particles synthesized by a method comprising:
  (a) Supplying one or more source materials containing one or more transition metals in a reactor;
  (b) Supplying ammonia in the reactor;
  (c) Optionally supplying a mineralizer which enhances the reaction between the source material and the ammonia;
  (d) Heating the reactor to attain supercritical condition of the ammonia.
17. An electric energy storage device according to paragraph 16, wherein the mineralizer contains at least one selected from Li, Na, K, Ca, Mg and Al.
18. An electric energy storage device according to paragraph 16 or paragraph 17, wherein the reactor is made of Ni—Cr based alloy.
19. An electric energy storage device according to any of paragraphs 16-18, wherein the reactor is heated to a temperature of 132° C. or higher.
20. An electric energy storage device according to any of paragraphs 16-19, wherein the reactor is a batch reactor which is sealed and self pressurized with heated ammonia.
21. An electric energy storage device according to any of paragraphs 16-19, wherein the reactor is a semi-batch reactor which enables supply of the source material, the ammonia, or the mineralizer or exhaust of gas, products, or byproducts during the synthesis.
22. An electric energy storage device according to of any of paragraphs 16-21, wherein the transition metal is V.
23. An electric energy storage device according to any of paragraphs 16-22, wherein the source material is metallic vanadium, vanadium oxide, vanadium pentoxide, ammonium metavanadate, or a mixture of one or more thereof.
24. An electric energy storage device according to any of paragraphs 16-23, wherein the particle size is less than 10 nm.
25. An electric energy storage device according to any of paragraphs 16-24, wherein the specific surface area of the particles is greater than 10 m²/g.
26. An electric energy storage device according to any of paragraphs 24-25, wherein the surface of the particles is oxidized.
27. An electric energy storage device according to any of paragraphs 24-26, wherein the particles do not contain halogen impurities.

Advantages and Improvements

The present invention discloses an ultracapacitor using transition metal nitride having negligible amount of halide impurities. The transition metal nitride is preferably synthesized by a halide-free basic ammonothermal process, in which the transition metal source contains little or no transition metal halide as fed into to the reactor, the solvent comprises halide-free ammonia as may be purchased commercially today, and the optional mineralizer contains little or no halide. The advantage of this construction is as follows:

1) Attaining high specific energy density with use of transition metal nitride particles for electrode materials
2) Attaining high reliability by avoiding potential corrosion of metal components by halide impurities.

The present invention also discloses a new method of producing transition metal nitride having one or more of the following advantages:

1) Highly cost-competitive due to closed reactor system.
2) Capable of forming nitride layer on surfaces of complicated structure due to high reactivity of supercritical ammonia.
3) Capable of forming nitride particles due to high reactivity of supercritical ammonia.
4) Free from unfavorable impurities such as halogens.

References

All references discussed in the application are incorporated by reference herein,

[1] United States Patent Application US 2008-0180881 A1.

[2] United States Patent Application US 2011-0149473 A1.

[3] Patrice Simon and Yury Gogots, Nature Materials vol. 7 (2008) 845.

[4] D. Choi, G. E. Blomgren, and P. N. Kumta, Advanced Materials 18 (2006) pp. 1178.

[5] United States Patent Application US 2010-0019207 A1.

Conclusion

This concludes the description of preferred embodiments of the invention. The following describes some alternative embodiments for accomplishing the present invention.

Although the examples described electrodes containing particles of vanadium nitride or vanadium-niobium nitride, other transition metal nitride such as titanium nitride, zirconium nitride. chromium nitride, molybdenum nitride, manganese nitride, iron nitride, cobalt nitride, nickel nitride can be used.

Although the examples described aluminum foil for metal foil, other metal foil such as copper foil and silver foil can be used.

Although the examples described capacitor-grade sheet of porous paper as a separator, other polymer material such as cellulose mesh can be used.

Although the examples described dilute KOH as electrolyte, other commonly used materials such as propylene carbonate, acetonitrile, boric acid, sodium borate or other weak acid (dipropyl ketone, glacial acetic acid, lactic acid, propionic acid, butyric acid, crotonic acid, acrylic acid, phenol, cresol, etc.) with addition of a salt (ammonium acetate, ammonium citrate, aluminum acetate, calcium lactate, ammonium oxalate, sodium perborate, trisodium phosphate, etc.), and solvent (monoethanolamine, diethanolamine, triethanolamine, diethylene glycol, glycerol, etc.) can be used. Although the examples describe a method of synthesizing vanadium nitride, molybdenum nitride and titanium nitride, other transition metal nitrides such as chromium nitride, scandium nitride, zirconium nitride can be synthesized with the same method. Also, alloy of transition metal nitrides can be synthesized with the same method.

Although the examples describe synthesis of foil of vanadium nitride, molybdenum nitride, and titanium nitride, other forms of transition metal nitrides such as nanocrystalline particles, microcrystalline particles, thin layers, and bulk single crystals can be produced with the same method. Also, low-temperature phase of transition metal nitride such as $Fe_{16}N_2$ may be preferably synthesized.

Although the examples describe a synthesis method using Na as a mineralizer, other alkali metal, alkaline earth metal or aluminum can be used as a mineralizer. Also, mixture of two or more mineralizers can be used.

Although the preferred embodiment describes a synthesis method in a specific temperature and pressure, other temperature and pressure setting can be used as long as the ammonia is in the supercritical condition.

Although the preferred embodiment describes a synthesis method using high-pressure reactor of a specific shape, other types of high-pressure reactor such as one with two lids, one with external high-pressure pump, one with high-pressure inlet port which enables constant feeding of source, mineralizer or ammonia can be used.

What is claimed is:

1. An electric energy storage device comprising
   (a) an anode electrode;
   (b) a cathode electrode;
   (c) a separator between the anode electrode and the cathode electrode;
   (d) an electrolyte between the anode electrode and the cathode electrode;
   wherein at least one electrode contains a transition metal nitride or mixture of transition metal nitrides having a negligible amount of halide impurities; and
   wherein the transition metal nitride or mixture of transition metal nitrides further contains an alkali metal additive.

2. An electric energy storage device of claim 1, wherein both the anode electrode and cathode electrode contain said transition metal nitride or mixture of transition metal nitrides, having the negligible amount of halide impurities.

3. An electric energy storage device of claim 1, wherein the alkali metal additive comprises at least one alkali metal from the group consisting of Li, Na, and K.

4. An electric energy storage device of claim 1, further comprising electric terminals connected to each electrode, exposed outside of a housing which encapsulates the anode electrode, the cathode electrode, the separator, and the electrolyte.

5. An electric energy storage device of claim 1, further comprising a stack of a plurality of a set of the anode electrode, the separator, and the cathode electrode, the stack being encapsulated in a housing having the electrolyte, with electric terminals connected to the outermost electrodes and exposed outside of the housing.

6. An electric energy storage device of claim 1, wherein the electrode comprises a porous film containing particles of transition metal nitride or mixture of transition metal nitrides formed on a metal foil.

7. An electric energy storage device of claim 6, wherein the porous film contains more than 10 weight percent of transition metal nitride or mixture of transition metal nitrides.

8. An electric energy storage device of claim 6, further comprising a metal foil, and wherein the metal foil comprises aluminum.

9. An electric energy storage device of claim 1, wherein the particles of the transition metal nitride or the mixture of transition metal nitrides have a specific surface area greater than 10 $m^2/g$.

10. An electric energy storage device of claim 1, wherein the particles of the transition metal nitride or the mixture of transition metal nitrides have a size less than 100 nm.

11. An electric energy storage device of claim 1, wherein the transition metal nitride comprises vanadium nitride.

12. An electric energy storage device of claim 1, wherein the electrolyte comprises propylene carbonate or acetonitrile.

13. An electric energy storage device of claim 1, wherein the electrolyte is a basic solution.

14. An electric energy storage device of claim 1, wherein the transition metal nitride is synthesized in supercritical ammonia.

15. An electric energy storage device according to claim 1, wherein the transition metal nitride or mixture of transition metal nitrides has less than 1 ppm of halide impurities.

16. An electric energy storage device having a first electrode and a second electrode, wherein at least one of the electrodes is formed using transition metal nitride particles synthesized by a method comprising:
   (a) supplying one or more source materials containing one or more transition metals in a reactor;
   (b) supplying ammonia in the reactor;

(c) supplying a mineralizer which enhances the reaction between the source material and the ammonia;

(d) heating the reactor to attain supercritical condition of the ammonia.

17. An electric energy storage device according to claim 16, wherein the mineralizer contains at least one selected from Li, Na, K, Ca, Mg and Al.

18. An electric energy storage device according to claim 16, wherein the reactor is made of Ni-Cr based alloy.

19. An electric energy storage device according to claim 16, wherein the reactor is heated to a temperature of 132° C. or higher.

20. An electric energy storage device according to claim 16, wherein the reactor is a batch reactor which is sealed and self pressurized with heated ammonia.

21. An electric energy storage device according to claim 16, wherein the reactor is a semi-batch reactor which enables supply of the source material, the ammonia, or the mineralizer or exhaust of gas, products, or byproducts during the synthesis.

22. An electric energy storage device according to 16, wherein the transition metal is V.

23. An electric energy storage device according to claim 16, wherein the source material is metallic vanadium, vanadium oxide, vanadium pentoxide, ammonium metavanadate, or a mixture of one or more thereof.

24. An electric energy storage device according to claim 16, wherein the particle size is less than 10 nm.

25. An electric energy storage device according to claim 24, wherein the surface of the particles is oxidized.

26. An electric energy storage device according to claim 24, wherein the particles do not contain halogen impurities.

27. An electric energy storage device according to claim 1, wherein the particles contain less than 1 ppm of halide impurities.

28. An electric energy storage device according to claim 16, wherein the specific surface area of the particles is greater than 10 $m^2/g$.

* * * * *